United States Patent [19]

Haws

[11] 4,259,218

[45] Mar. 31, 1981

[54] RUBBER COMPOSITIONS AND METHOD THEREFOR

[75] Inventor: John R. Haws, Bartlesville, Okla.

[73] Assignee: Phillips Petroleum Company, Bartlesville, Okla.

[21] Appl. No.: 473

[22] Filed: Jan. 2, 1979

[51] Int. Cl.³ .............................. C08L 7/00; C08K 3/04
[52] U.S. Cl. ........................................ 260/5; 152/359; 260/42.32; 260/42.47; 525/236
[58] Field of Search ...................... 260/5, 42.32, 42.47; 526/41, 335; 264/331; 525/236

[56] References Cited

U.S. PATENT DOCUMENTS

| | | | |
|---|---|---|---|
| 3,364,156 | 1/1968 | Kraus | 260/5 |
| 3,652,729 | 3/1972 | Brodoway | 260/878 R |
| 3,675,009 | 7/1972 | Kraus | 250/49.5 R |
| 3,725,103 | 4/1973 | Jordan | 106/307 |
| 3,799,788 | 3/1974 | Jordan | 106/307 |
| 3,830,774 | 8/1974 | Jordan | 260/42.46 |
| 3,915,653 | 10/1975 | Cheng | 23/259.5 |
| 3,937,681 | 2/1976 | Nordsiek | 260/33.6 AQ |
| 3,978,165 | 8/1976 | Stumpe, Jr. et al. | 260/894 |
| 4,071,496 | 1/1978 | Kraus et al. | 260/42.32 |
| 4,192,366 | 3/1980 | Scriver, Jr. et al. | 152/209 R |

FOREIGN PATENT DOCUMENTS

1166832 10/1969 United Kingdom .

Primary Examiner—Theodore E. Pertilla

[57] ABSTRACT

A particular carbon black in a medium vinyl polybutadiene composition gives a vulcanizable rubber composition with superior blowout resistance, low heat buildup, and good resilience after vulcanizing. Such a carbon black in blends of medium vinyl polybutadiene and natural rubber provides a vulcanizable rubber composition having good dynamic wire cord adhesion (as measured by time to failure).

26 Claims, 4 Drawing Figures

RUBBER COMPOSITIONS AND METHOD THEREFOR

FIELD OF THE INVENTION

This invention relates to a vulcanizable rubber composition and a method of producing same. In one aspect, it relates to a vulcanized rubber composition. In another aspect, it relates to articles of manufacture prepared from such vulcanized rubber compositions.

BACKGROUND OF THE INVENTION

An area in which new solutions are constantly being sought is the problem area of how to prevent heat buildup and blowouts in vulcanized rubber compositions. How to improve the dynamic wire cord adhesion of vulcanized rubber compositions is also important, especially in the area of belted tires.

It is well known to use carbon black as an ingredient in rubber compositions in order to impart favorable characteristics to the rubbers. A broad variety of carbon blacks has been disclosed in the art. Since carbon black cannot be sufficiently characterized by its chemical composition or by its ingredients, it has become widely accepted to characterize a carbon black by the properties it exhibits. For example, a carbon black can be characterized by its surface area (which is usually a measurement of the size of the nodules making up the carbon black). Another important characteristic of a carbon black is its structure, which is a measure of the complexity of the individual carbon black aggregates or of the number of nodules which are "fused" together in one carbon black aggregate. Another important characteristic (which is defined below) is the tint residual of a carbon black.

The properties of carbon blacks are measured by using standardized ASTM tests; and those tests define those properties.

Resistance of degradation of rubber specimens is indirectly measured by ASTM D 623-67, which directly measures the time to blowout of specimens under stress. Generally, when time to blowout of a specimen is relatively high, heat buildup (as measured by $\Delta T$) in the specimen will be relatively low. However, it is not necessarily true that of two different specimens, the one having the higher time to blowout will have the lower heat buildup since resistance to degradation may be different in the two specimens.

Recently, in the prior art, it has been found that by using a carbon black with a low tint residual in a vulcanizable rubber composition, one will obtain a rubber composition which after vulcanizing has a significantly lower heat buildup (or hysteresis) than one obtains by incorporating a carbon black with a higher tint residual in the same rubber composition, the abrasion resistance of such rubber compositions incorporating these two different carbon blacks being essentially equal.

By using a carbon black having a highly negative tint residual value in a particular rubber, one produces a significantly improved rubber composition over those disclosed in the prior art.

It is an object of this invention to produce a vulcanizable rubber composition having low heat buildup properties and long times to blowout after vulcanization.

It is a further object of this invention to produce a vulcanized rubber composition with low heat buildup properties and long times to blowout.

It is a still further object of this invention to produce articles of manufacture with low heat buildup properties and long times to blowout.

Yet another object of this invention is to produce a vulcanizable rubber composition with high dynamic wire cord adhesion after vulcanization.

A further object of this invention is to produce a vulcanized rubber composition with high dynamic wire cord adhesion.

A still further object of this invention is to produce articles of manufacture with high dynamic wire cord adhesion.

STATEMENT OF THE INVENTION

According to the invention, a carbon black having a highly negative tint residual in a polybutadiene having a medium vinyl content results in a rubber composition after vulcanization that unexpectedly has a much higher blowout time than other rubber compositions prepared from the same carbon black and from a different rubber or from the same rubber and a different carbon black. Also according to the invention, when a carbon black having a highly negative tint residual is mixed with a blend of medium vinyl polybutadiene and natural rubber, the dynamic wire cord adhesion of the resulting vulcanized mixture is unexpectedly higher than when the same carbon black is used in vulcanized natural rubber or in vulcanized medium vinyl polybutadiene and also is higher than when a different carbon black is used in the same rubber or rubber blend.

The rubbery polymer compositions according to the invention can be used to advantage in carcass and tread applications, in the production of tires, belts, and in other articles of manufacture which encounter flexing. The excellent combination of long blowout time, low heat buildup, and good resilience of the novel compositions are especially well suited to such applications.

BRIEF DESCRIPTION OF THE DRAWINGS

FIGS. 1 and 2 show graphs of wire cord adhesion data for various vulcanized invention and control compositions comprising blends of natural rubber and medium vinyl polybutadiene.

DESCRIPTION OF THE PREFERRED EMBODIMENTS

In this invention "medium vinyl" is defined to be a vinyl content lying within the range from about 30 to about 80 mole percent vinyl pendant groups. That is, about 30 to about 80 mole percent of the butadiene which was polymerized underwent 1,2-polymerization.

In this invention, tint residual (TR) of a carbon black is defined by the following formula:

$$TR = T - [56.0 + 1.057(CTAB) - 0.002745(CTAB)^2 - 0.2596(DBP) - 0.201(N_2SA \cdot CTAB)].$$

In this formula, the abbreviations have the following meanings; and the properties are measured as described below.

CTAB: This is the surface area in square meters per gram ($m^2/g$) of the carbon black measured as described by J. Janzen and G. Kraus in Rubber Chemistry and Technology 44, 1287 (1971).

$N_2SA$: This is the surface area in $m^2/g$ of the carbon black measured using nitrogen in accordance with the ASTM method D-3037-71T.

DBP: This is the structure of the carbon black in cubic centimeters per 100 grams (cc/100 g) and is measured in accordance with U.S. Pat. No. 3,548,454 and, after crushing, by method B in accordance with ASTM D-2414-70. This property is also referred to as 24M4 DBP.

T: This is the tint or tinting strength of the carbon black, a property which is associated with the reflectance of light by the carbon black. It is measured by arbitrarily assigning the reference black IRB (Industry Reference Black) No. 3 the value of 100; and is measured in accordance with ASTM 3265-75.

Tint residual is a quantity which gives a good measure of the aggregate size distribution of a carbon black, correlating well with measurements of aggregate size distributions obtained by other methods.

In the practice of the invention, a carbon black is selected such that its tint residual is about −6 or less; and generally the tint residual will be in the range from about −6 to about −20. Although the tint can be selected broadly, the tint of the selected carbon black will generally lie in the range from about 70 to about 100 when the tint residual is about −6 or less. Such carbon blacks generally have CTAB surface areas of about 70 to about 140 m$^2$/g, 24M4 DBP structures of about 65 to about 115 cc/100 g, and porosities (N$_2$SA−CTAB) of about 25 m$^2$/g or less. Carbon blacks suitable for use in the invention can be prepared by any suitable method, for example by the method disclosed in U.S. Pat. No. 4,071,496. If desired, mixtures of suitable carbon blacks can be used.

The polybutadiene rubbery polymers which are used in the practice of this invention generally have a medium (i.e., about 30 to about 80 mole percent) vinyl content. More often, the vinyl content will be within the range from about 35 to about 70 mole percent. Excellent results were obtained when the vinyl content was within the range from about 40 to about 65 mole percent. The vinyl content of the polybutadiene can be determined by use of infrared spectroscopy methods, which are well known in the art. The trans content of these rubbers will generally range from about 70 to about 0 mole percent, and the cis content will generally range from about 70 to about 0 mole percent. More often, the trans and cis content will both be within the range from about 70 to about 10 mole percent. Suitable polymers have Mooney viscosity (ML-4) values as determined at 100° C. ranging from about 35 to about 60 (as determined by ASTM D 1646-61). The polybutadiene can be either star-shaped (i.e., radial) or can be substantially linear (but having, however, 1,2-microstructure content within the broad range given above).

The polybutadiene polymers can be prepared by any suitable polymerization method. For example, they can be prepared by polymerizing 1,3-butadiene in the presence of a hydrocarbon diluent at a pressure such that at least a portion of the monomer is in the liquid phase. The polymerization in this method is usually carried out at a temperature in the range from about 0° to about 250° F. (about −18° to about 121° C.). An example of a suitable catalyst to employ in this polymerization comprises molybdenum pentachloride and a mixture of a nickel component (e.g., nickel stearate, nickel oxide, or nickel chloride) and an organometallic compound (e.g., triethylaluminum, benzyllithium, or methylaluminum sesquibromide). By varying the amount of molybdenum pentachloride in the catalyst system, it is possible to produce polymers having high vinyl structural configurations (which are produced when the content of MoCl$_5$ is low) or to produce polymers having high cis structural configurations (when the content of MoCl$_5$ is high). A suitable method for polymerizing 1,3-butadiene is described in detail in U.S. Pat. No. 3,480,608.

An example of another suitable method of producing polybutadiene rubbery polymers suitable for use in this invention is to polymerize 1,3-butadiene in a hydrocarbon diluent, employing an alkyllithium initiator (for example, n-butyllithium) and a vinyl promoter (for example, tetrahydrofuran or tetramethylethylenediamine) to promote 1,2-addition in the formation of polybutadiene. As the vinyl promotor concentration increases, the vinyl content of the rubber increases. In addition, the lithium-terminated polymer chains can be coupled (if desired) by introducing a multifunctioned coupling agent (for example, SnCl$_4$, SiCl$_4$, or epoxidized oils) into the polymerization zone to obtain star-shaped (i.e., radial) polymers. U.S. Pat. No. 3,301,840 discloses the details of such a suitable polymerization process; and U.S. Pat. No. 3,393,182 discloses the details of coupling of lithium-terminated polymers of 1,3-butadiene with tin compounds (e.g., stannic chloride).

In the embodiments utilizing natural rubber in blends with polybutadiene, the natural rubber can be any natural rubber suitable for use in extruded or molded products.

For the embodiment employing medium vinyl polybutadiene which is not blended with natural rubber, a suitable range of proportions of carbon black and polybutadiene rubbery copolymer is given below:

| Ingredient | Broad Range Parts by Weight | Preferred Range Parts by Weight |
|---|---|---|
| Carbon black | 30–65 | 40–60 |
| Polybutadiene | 100 | 100 |

If a blend of polybutadiene and natural rubber is used, amounts of polybutadiene and natural rubber can be selected over a broad range but will generally be selected from the table given below.

| Ingredient | Broad Range Parts by Weight | Preferred Range Parts by Weight |
|---|---|---|
| Carbon black | 30–65 | 40–60 |
| Polybutadiene | 15–85 | 25–75 |
| Natural rubber | 85–15 | 75–25 |

A variety of vulcanizing systems are known. These can involve use of sulfur, or they can be sulfurless. Examples of systems which can be used to cure polybutadiene or blends of polybutadiene and natural rubber include (but are not limited to) sulfur-sulfenamide, tetramethylthiuram disulfide, and dicumyl peroxide. Although any suitable curing system can be used in the practice of the invention for curing the rubbery material which is used (i.e., polybutadiene either unblended or blended with natural rubber), sulfur will generally be used in the cure.

Generally, besides the carbon black, polybutadiene, natural rubber (if used) and curing agent (typically, sulfur), accelerators, antioxidants, flexcracking inhibitors, and extender oils may (if desired) be added to the mixture. An example of a suitable accelerator for use with the inventive ingredients is N-cyclohexyl-2-benzothiazole sulfenamide; an example of a suitable antioxidant is Flexamine ® G (which is manufactured by Uniroyal, Inc. and is a complex diarylamine-ketone reaction product (65%) and N-N-diphenyl-p-phenylenediamine (35%); an example of a suitable flexcracking inhibitor which also is an antioxidant is Santoflex ® AW (which is 6-ethoxy-1,2-dihydro-2,2,4-trimethylquinoline and which is available from Monsanto Company); and an example of a suitable extender oil is Philrich ® #5 (which is available from Phillips Petroleum Company). Generally, a small amount of zinc oxide and stearic acid will be used in the mixture in order to activate the curing agents.

The carbon black, polybutadiene rubbery polymer or blend thereof with natural rubber (if used), and curative used to produce the cured composition in the practice of the invention, together with other components (if desired), can be mixed together in any suitable manner so as to obtain a relatively homogeneous mixture. Generally, however, the carbon black, polybutadiene, and natural rubber (if used) will first be mixed together; and then other ingredients will be added later. In particular, the curing agent will generally be added last so as to avoid premature curing. The carbon black, polybutadiene and natural rubber (if used) will generally be mixed together at a temperature within the range from about 65° to about 125° C. and by means, for example, of a roll mill or an internal mixer such as a Banbury mixer for a time sufficient to effect good mixing, e.g., about 5–45 minutes.

Generally, after the components are thoroughly mixed, the mixture will be either sheeted out or placed in a mold; and the mixture will be cured by being heated under pressure for an appropriate length of time. This procedure will be followed in preparing test specimens or articles of manufacture. For the polybutadiene mixture described above, the curing temperature will generally be within the range from about 270° to about 340° F. (132°–171° C.) and the pressure applied will generally be from about 600 to about 20,000 psi (4.1-138 MPa). When the temperature and pressure in the curing operation lies within the range described above, curing will generally be accomplished within a time period from about 20 to about 70 minutes, depending also upon the size of the specimens being cured. When the specimens are relatively thin sheets (as described in ASTM D 412-68) or when they are small pellets (as described in ASTM D 623-67), curing will generally be effected within a time period ranging from about 30 to about 45 minutes. However, if the above formulation is in the form of a tire, for example, the curing period required will generally be about 60 to about 70 minutes. For such rubbery polybutadiene polymers or blends thereof with natural rubber, a curing period is selected by observing a combination of properties of the rubber (including tensile strength, modulus, and permanent set). Generally, after a curing period of about 30 minutes, these properties will have reached a stable value and will continue to have that value even if curing is continued for a longer period of time (for example, about 15 minutes longer). The curing period required for a given rubber copolymer mixture, however, depends upon the temperature chosen, upon the amount of material being cured, and upon the nature of the chosen curing agents.

EXAMPLES

Four carbon blacks (labeled carbon black #1, carbon black #2, carbon black #3, and carbon black #4), each having a highly negative tint residual, were prepared according to the process given in U.S. Pat. No. 4,071,496; and each was used in various compositions. Carbon black #1 was used in the invention runs in Example I, carbon black #2 was used in the invention runs in Example II, and carbon blacks #3 and #4 were used in the invention runs in Examples III and IV, respectively. Industry carbon blacks similar to carbon blacks #1, #2, #3, and #4 in surface area and structure but different in tint residual and tints were used as controls in Examples I, II, III, and IV.

The medium vinyl polybutadienes used in the practice of the invention were prepared in cyclohexane solvent using n-butyllithium as an initiator and tetrahydrofuran as a vinyl promoter. The resulting lithium-terminated polymers were coupled with $SnCl_4$ and were then recovered.

When natural rubber was used in a blend with medium vinyl polybutadiene, a natural rubber with a Mooney value within the range as described above and medium vinyl polybutadiene as described above were mixed in amounts within the ranges described above.

Various compositions containing either carbon black #1, #2, #3, or #4 or a control carbon black in a variety of rubber bases were prepared. If the rubber base used was a blend, the materials used in the blend in the appropriate amounts were first substantially admixed. The rubber base and carbon black which were used in each respective composition were then mixed for a period of time such that the base and carbon black were substantially admixed. Then, the remaining ingredients (shown in Tables IB, IIB, and IIIB) were added; and mixing was continued until dispersion was substantially completed, e.g., about 5 minutes. Test specimens (each having a shape and size as required in the ASTM test which was used) were formed from each composition; and various properties of these compositions were then determined. In each recipe, the components are given in parts by weight. Unexpectedly, as described below in Examples I and II when carbon black #1 or carbon black #2 was placed in particular into medium vinyl polybutadiene rubbery copolymer which was not a blend with natural rubber, the composition showed improved hysteresis properties, (i.e., long blowout times and low heat buildup, as measured by $\Delta T$), in comparison with compositions using the same respective carbon black in natural rubber or in other synthetic rubber compositions. Also unexpectedly, as described below in Examples III and IV, when carbon black #3 or carbon black #4 was placed into various blends of natural rubber with a particular medium vinyl polybutadiene, the resulting vulcanized compositions showed markedly improved dynamic wire cord adhesion in comparison with vulcanized compositions using the same respective carbon black in either natural rubber or in medium vinyl polybutadiene and in comparison with a control carbon black in the same respective vulcanized rubber compositions.

EXAMPLE I

The properties of a control industry reference carbon black designated as IRB #3 (which in the industry has been given the arbitrary tint value of 100) and carbon black #1 (having a highly negative tint residual) are given in Table I-A. These carbon blacks were used in subsequent compositions (described in Table I-B), and the test results appear in Table I-C.

TABLE I-A

| Physical Property | IRB #3 (Control) | Carbon Black #1 |
|---|---|---|
| $N_2SA$, $m^2/g^{(a)}$ | 85 | 79 |

TABLE I-A-continued

| Physical Property | IRB #3 (Control) | Carbon Black #1 |
|---|---|---|
| CTAB, m²/g[b] | 83 | 80 |
| 24M4 DBP cc/100 g[c] | 88 | 85 |
| Tint (T)[d] | 100 | 90 |
| Tint Residual (TR)[e] | −2 | −11 |

The properties shown in Table I-A indicate that carbon black #1 and IRB #3 are similar in surface area and structure but differ appreciably in tint residual and tint.

Various compositions containing either carbon black #1 or IRB #3 were prepared in accordance with the recipe shown in Table I-B.

The mixing procedure for preparing each rubber composition was as follows. A Midget Banbury mixer at a rotational speed of 120 rpm was used with a jacket temperature of 60° C. and a 6 minute mix. This was followed by a 1½ minute remix in the Midget Banbury mixer at 80 rpm, with cooling water in the jacket. Following this mixing was a 5 minute remill on a roll mill at a roll temperature of 70° C.

Various ASTM tests were run on test specimens; and the results are shown in Table I-C. In some tests, minor variations from the ASTM procedures were made. Any such variations are noted following the test number.

TABLE I-B
(Parts by Weight)

| | Run No. | | | | | | | |
|---|---|---|---|---|---|---|---|---|
| | 1 | 2 | 3 | 4 | 5 | 6 | 7 | 8 |
| Natural Rubber[a] | 100 | 100 | 75 | 75 | — | — | — | — |
| Cis-4 1203[b] | — | — | 25 | 25 | — | — | — | — |
| Polybutadiene, 45.1% vinyl[c] | — | — | — | — | 100 | 100 | — | — |
| Polybutadiene, 64.4% vinyl[d] | — | — | — | — | — | — | 100 | 100 |
| Carbon Black #1 | 50 | — | 50 | — | 50 | — | 50 | — |
| Carbon Black, IRB #3 | — | 50 | — | 50 | — | 50 | — | 50 |
| Sulfur | 2.5 | 2.5 | 2.3 | 2.3 | 1.9 | 1.9 | 1.9 | 1.9 |
| Santocure[e] | 0.6 | 0.6 | 0.6 | 0.6 | 1.0 | 1.0 | 1.0 | 1.0 |

Note:
Each composition also contained in parts by weight 3.0 zinc oxide, 2.0 stearic acid, 1.0 Flexamine® G[f], 1.5 Santoflex® AW[g], and 7.0 Philrich® #5[h].
[a]Natural rubber SMR-5L, (commercially obtainable Standard Maylaysian rubber 5L, broken down to a value of 54 ML-4 Mooney at 100° C. as determined by ASTM D 1646-61).
[b]High cis-polybutadiene rubber commercially available under the trademark Cis-4® polybutadiene 1203, Phillips Petroleum Company, Bartlesville, OK.
[c]Polybutadiene, 43 ML-4 Mooney at 100° C.; microstructure is 45.1% vinyl, 30.0% trans, 24.9% cis.
[d]Polybutadiene, 49 ML-4 Mooney at 100° C.; microstructure is 64.4% vinyl, 15.9% trans, 19.7% cis.
[e]N-cyclohexyl-2-benzothiazole sulfenamide as accelerator.
[f]Complex diarylamine-ketone reaction product (65%) and N-N-diphenyl-p-phenylene-diamine (35%), an antioxidant, manufactured by Uniroyal, Inc.
[g]6-Ethoxy-1,2-dihydro-2,2,4-trimethylquinoline, antioxidant and flexcracking inhibitor, manufactured by Monsanto Company.
[h]A highly aromatic extender oil available from Phillips Petroleum Company.

TABLE I-C

| | | Run No. | | | |
|---|---|---|---|---|---|
| | | 1 | 2 | 3 | 4 |
| | Minutes | Natural Rubber | | 75/25 Natural Rubber/Cis 4® | |
| Property | Cure at 302° F. | Carbon Black #1 | IRB #3 | Carbon Black #1 | IRB #3 |
| 300% modulus[a], psi (MPa) | 45 | 1220 (8.41) | 1300 (8.96) | 1220 (8.41) | 1190 (8.20) |
| Tensile[a], psi (MPa) | 45 | 3110 (21.4) | 3420 (23.6) | 3140 (21.6) | 3240 (22.3) |
| Elongation[a], % | 45 | 540 | 560 | 540 | 590 |
| Permanent set[b], % | 45 | 1.7 | 1.6 | 1.4 | 1.5 |
| Yerzley Resilience[c], % | 45 | 70.5 | 69.2 | 72.8 | 71.4 |
| ΔT[d], °F. (°C.) | 30 | 48.0 (8.9) | 52.0 (11.1) | 47.6 (8.7) | 50.0 (10.0) |
| | 45 | 54.0 (12.2) | 58.0 (14.4) | 52.5 (11.4) | 55.3 (12.9) |
| Blowout Test | | | | | |
| ΔT[e], °F. (°C.) | 30 | 76 (24.4) | 97 (36.1) | 82 (27.8) | 92 (33.3) |
| 10 min. after start | 45 | 128 (53.3) | 134 (56.7) | *nd — | *nd — |
| Time to blowout[e] | 30 | 15.4 | 16.3 | 14.7 | 15.5 |
| minutes | 45 | 14.3 | 13.4 | 9.8 | 9.7 |
| Blowout, surface temp.[f], 10 min. after start, °F. (°C.) | 45 | 346 (174.4) | 347 (175.0) | 340 (171.1) | 353 (178.3) |
| Time to blowout[f], (severe test) minutes | 45 | 11.6 | 11.6 | 12.1 | 11.8 |

| | | Run No. | | | |
|---|---|---|---|---|---|
| | | 5 | 6 | 7 | 8 |
| | Minutes | 45.1% Vinyl Polybutadiene | | 64.4% Vinyl Polybutadiene | |
| Property | Cure at 302° F. | Carbon Black #1 | IRB #3 | Carbon Black #1 | IRB #3 |
| 300% modulus[a], psi (MPa) | 45 | 1720 (11.8) | 1570 (10.8) | 1440 (9.93) | 1430 (9.86) |
| Tensile[a], psi (MPa) | 45 | 2570 (17.7) | 2530 (17.4) | 2310 (15.9) | 2320 (16.0) |
| Elongation[a], % | 45 | 390 | 410 | 400 | 410 |
| Permanent set[b], % | 45 | 0.8 | 0.9 | 0.9 | 1.1 |
| Yerzley Resilience[c], % | 45 | 73.0 | 71.3 | 69.7 | 68.1 |
| ΔT[d], °F. (°C.) | 30 | 56.6 (13.7) | 60.7 (15.9) | 56.9 (13.8) | 61.1 (16.2) |

TABLE I-C-continued

|  |  |  |  |  |  |
|---|---|---|---|---|---|
|  | 45 | 55.7 (13.2) | 60.6 (15.9) | 56.7 (13.7) | 58.7 (14.8) |
| Blowout Test |  |  |  |  |  |
| $\Delta T^{(e)}$, °F. (°C.) | 30 | 75 (23.9) | 89 (31.7) | 76 (24.4) | 81 (27.2) |
| 10 min. after start | 45 | 74 (23.3) | 82 (27.8) | 69 (20.6) | 76 (24.4) |
| Time to blowout$^{(e)}$ | 30 | >60 | >60 | >60 | >60 |
| minutes | 45 | >60 | >60 | >60 | >60 |
| Blowout, surface temp.$^{(f)}$, 10 min. after start, °F. (°C.) | 45 | 329 (165.00) | 360 (182.2) | 309 (153.9) | 324 (162.2) |
| Time to blowout$^{(f)}$, (severe test) minutes | 45 | 20.4 | 17.6 | >30 | 25.6 |

*Not determined.
$^{(a)}$Determined in accordance with ASTM D 412-68.
$^{(b)}$Determined in accordance with ASTM D 623-67 (Method A).
$^{(c)}$Determined substantially in accordance with ASTM D 945-72; the sample cylinder had a diameter of 0.7 inch and height of 1.0 inch.
$^{(d)}$Determined substantially in accordance with ASTM D 623-67, method A; test time: 15 minutes; load: 990 kPa (143 psi); stroke: 4.45 mm (0.175 inch); oven temp: 37.8° C. (100° F.).
$^{(e)}$Determined substantially in accordance with ASTM D 623-67, method A, using a Goodrich Flexometer; load: 1380 kPa (200 psi); stroke: 5.72 mm (0.225 inch); oven temperature: 100° C. (212° F.).
$^{(f)}$Determined substantially in accordance with ASTM D 623-67, method B (severe test), using a Firestone Flexometer; load: 222 N (500 lbs.); throw: 13.9 mm (0.55 inch).

Referring to Table I-C, one notes that the particular inventive combination of carbon black #1 and 64.4% vinyl polybutadiene (displayed as run 7) gave the longest time to blowout in the more severe blowout test (method B of ASTM D 623-67, see footnote (f) in Table I-C), longer than any other combination of carbon black and rubbery polymer, this value being 30 minutes. This value and that in run #5 for the combination of 45.1% vinyl polybutadiene and carbon black #1 (20.4 minutes) are much greater than those values of the same carbon black in natural rubber and in 75/25 natural rubber/Cis 4 ® rubber (indicated in columns 1 and 3). Cis 4 ® rubber was defined in Table I-B.

It is also noted that carbon black #1 in any of the rubbers in Table I-C is more effective than IRB #3 in that same rubber for increasing resiliency and lowering heat buildup (as measured by $\Delta T$) of the rubber.

It should also be noted that the heat buildups (as measured by $\Delta T$ 10 minutes after start) of the compositions in runs 5 and 7 are less than the corresponding values in runs 6 and 8, particularly for a cure period of 30 minutes, and are less than the corresponding values in runs 1 and 3 particularly for a cure period of 45 minutes; and the resiliences of the compositions in runs 5 and 7 are about the same as those in runs 1, 3, 6 and 8.

Although as shown in Table I-B, the amount of sulfur (which was used as a curing agent) and the amount of Santocure ® (which was used as an accelerator) was not held constant for all runs in Example I, it is believed that the effect of the variation in these components on blowout time does not significantly affect the validity of the conclusion that the combination of a carbon black having a highly negative tint residual in a medium vinyl polybutadiene gives a composition having an unexpectedly high blowout time as compared with the same carbon black in other rubbery compositions. This is so because it is commonly accepted in the art that natural rubber and synthetic rubber should be compounded at different combinations of sulfur and accelerator to develop optimum properties in the rubbers. Therefore, by using for each rubber composition an amount of curing agent and accelerator which will optimally cure that rubber composition, the effect of the amount of curing agent and accelerator on the data will be virtually eliminated.

Although run #7 had the longest time to blowout, it is noted that $\Delta T$ of run 7 is not the lowest $\Delta T$ measured, compositions other than those in run #7 appearing to be less resistant to degradation than that of run #7. It is also possible that in comparing values of $\Delta T$ which are not greatly different, such small differences may fall within the margin of experimental error.

EXAMPLE II

In this example carbon black #2, as well as a second commercially available control carbon black designated as N 220 #7, were used in preparing rubbery compositions which were subjected to various tests. In Table II-A, the properties of these two carbon blacks are compared. One can see that these two carbon blacks are quite similar except for their tint and tint residual values.

TABLE II-A

| Physical Property | N 220 #7 (Control)$^{(a)}$ | Carbon Black #2 |
|---|---|---|
| $N_2SA$, m$^2$/g | 125 | 125 |
| CTAB, m$^2$/g | 110 | 105 |
| 24M4 DBP, cc/100 g | 100 | 103 |
| Tint | 110 | 97 |
| Tint Residual | 0 | −9 |

$^{(a)}$Carbon black available from the Phillips Petroleum Company, Bartlesville, OK Each of these two carbon blacks was used in preparing various compositions, the recipes of which are shown in Table II-B.

TABLE II-B

| | (Parts by Weight) | | | |
|---|---|---|---|---|
| | Run No. | | | |
| Ingredient | 9 | 10 | 11 | 12 |
| Natural Rubber | 100 | 100 | — | — |
| Polybutadiene, 45.1% vinyl | — | — | 100 | 100 |
| Carbon Black #2 | 50 | — | 50 | — |
| Carbon Black, N-220 #7 | — | 50 | — | 50 |
| Zinc Oxide | 3 | 3 | 3 | 3 |
| Stearic Acid | 2 | 2 | 2 | 2 |
| Flexamine ® G | 1 | 1 | 1 | 1 |
| Santoflex ® AW | 1.5 | 1.5 | 1.5 | 1.5 |
| Philrich ® #5 | 7 | 7 | 7 | 7 |
| Sulfur | 2.5 | 2.5 | 1.75 | 1.75 |
| Santocure ® | 0.6 | 0.6 | 0.9 | 0.9 |

Note: All components are described in footnotes in Table I-B.

The amounts of sulfur (which was used as curing agent) and Santocure# (which was used as an accelerator) were not held constant in runs 9 through 12; however, based on the experience of the inventor, these amounts were chosen so that they would optimally cure the various rubbery compositions in which they were placed. It is believed that the effect of the variation in these components on blowout time does not significantly affect the validity of the conclusion that the combination of a carbon black having a highly negative tint residual in a medium vinyl polybutadiene gives a composition having an unexpectedly high blowout time as compared with the same carbon black in other rubbery compositions. This is so because, as discussed above, the addition of different amounts of accelerator and curing agent to different rubbers actually can tend to remove the effect of the amounts of these materials from the properties of the prepared rubbers.

The test results obtained from testing specimens prepared from the compositions shown in Table II-B are presented in Table II-C.

composition with the better time to blowout of another composition.

It is likewise appropriate to compare for two compositions the lower value of heat buildup (as measured by $\Delta T$) associated with either the 30 minute cure or 45 minute cure, as well as the higher value of resilience associated with either the 30 minute or 45 minute cure.

When the lower value of heat buildup (as measured by $\Delta T$) associated with either the 30 minute or 45 minute cure is used for purposes of comparison, the heat buildup (as measured by $\Delta T$) of the sample in invention run #11, 10 minutes after start, (36.7° C.), is less than that of control runs 9, 10, and 12. However, the value of Max. $\Delta T$ for run #11 is not smaller than that of control

TABLE II-C

| | | (Control) | (Control) | (Invention) | (Control) |
|---|---|---|---|---|---|
| | | | Run No. | | |
| | | 9 | 10 | 11 | 12 |
| Property | Minutes Cure at 293° F. (145° C.) | Natural Rubber Exper. Black | Natural Rubber Control Black | 45.4% Vinyl PBD Exper. Black | 45.1% Vinyl PBD Control Black |
| 300% modulus$^{(a)}$ | | | | | |
| psi (MPa) | 30 | 1850 (12.8) | 1560 (10.8) | 1380 (9.51) | 1160 (8.00) |
| | 45 | 1690 (11.7) | 1500 (10.3) | 1660 (11.4) | 1190 (8.20) |
| Tensile,$^{(a)}$ psi (Mpa) | 30 | 3670 (25.3) | 3760 (25.9) | 3170 (21.9) | 3130 (21.6) |
| Elongation,$^{(a)}$ % | 30 | 490 | 550 | 520 | 590 |
| Permanent set,$^{(b)}$ % | 30 | 2.2 | 2.5 | 3.1 | 4.5 |
| | 45 | 2.2 | 2.6 | 1.9 | 2.9 |
| Yerzley resilience,$^{(c)}$ % | 30 | 69.0 | 66.8 | 67.8 | 64.7 |
| | 45 | 68.1 | 62.9 | 68.4 | 65.6 |
| Blowout Test | | | | | |
| $\Delta T^{(d)}$, °F.(°C.) at | 30 | 120 (48.9) | 113 (45.0) | 114 (45.6) | 108 (42.2) |
| 10 min. after start | 45 | 113 (45.0) | 111 (43.9) | 98 (36.7) | 110 (43.3) |
| Max. $\Delta T,^{(d)}$ °F.(°C.) | 30 | 146 (63.3) | 175 (79.4) | 118 (47.8) | 110 (43.3) |
| | 45 | 110 (43.3) | 112 (44.4) | 111 (43.9) | 110 (43.3) |
| Time to blowout,$^{(d)}$ | | | | | |
| minutes | 30 | 12.5 | 16.3 | 15.5 | 15.3 |
| | 45 | 21.0 | 13.1 | >60 | 12.8 |

Notes: $^{(a)}$Determined in accordance with ASTM D 412-68. Results given both in pounds per square inch (psi) and in Megapascals (MPa).
$^{(b)}$Determined in accordance with ASTM D 623-67 (method A), which refers back to ASTM D 395 for the calculation procedure.
$^{(c)}$Determined substantially in accordance with ASTM D 945-72, using a sample cylinder with a diameter of 0.7 inches and a height of 1.0 inch.
$^{(d)}$Determined substantially in accordance with ASTM D 623-67 (method A),with a load of 1380 kPa (200 psi), a stroke of 5.72 mm (0.25 inch), and an oven temperature of 100° C. (212° F.), using a Goodrich Flexometer.

The procedure of mixing used in forming the various compositions in Example II was the following. Each batch was mixed for 8 minutes on a roll mill with rolls at a temperature of 70° C. This mixing was followed by one remill on a roll mill for 3 minutes, with a roll mill temperature of 70° C.

Comparing the time to blowout of invention run #11 with control runs 9, 10 and 12 for the cure period of 45 minutes, one notes that the time to blowout of the invention composition (which time is greater than 60 minutes) is remarkably outstanding, and in particular is much greater than the 21 minute time to blowout of the same carbon black in natural rubber, as well as much greater than that of the control black both in natural rubber and in 45.1 percent vinyl polybutadiene.

Examining the data in Table II-C, one observes that the curing period markedly influences the time to blowout. However, this fact does not detract from the remarkably high time to blowout of run #11 for a curing period of 45 minutes. Based on applicant's experience, it is believed that a curing period from about 30 to about 45 minutes is a optimal curing period for all of the rubber compositions shown in Table II-C. Therefore, it is believed that since each of the compositions shown in Table II-C was cured to an optimal curing level either in a 30 minute curing period or in a 45 minute curing period, the effect of cure level on the data is removed when one compares the better time to blowout (corresponding to either the 30 or 45 minute cure) of one runs 9, 10, and 12. It is emphasized, however, that the most important characteristic of the sample in run #11 is the resistance to degradation (as measured by time to blowout), which is remarkably high. It is noted that the higher value (associated with either the 30 minute or 45 minute cure) of the resilience of the composition in run 11 (68.4%) is almost equal to that of run 9 (69.0%), which is the highest resilience value in Table II-C.

The data in Tables I-C and II-C generally agree with the prior art finding that of two carbon blacks which are otherwise substantially similar, the carbon black with the lower tint residual value will have the lower value of heat buildup (as measured by $\Delta T$). However, in Table II-C the value of $\Delta T$, 10 minutes after start, for run #9 (45.0° C.) is larger than that for run #10 (43.9° C.), contrary to what would have been predicted. It is believed that this result may fall within the margin of experimental error.

In conclusion, the combination of a medium vinyl polybutadiene with a carbon black having a highly negative tint residual clearly results in compositions having outstandingly long times to blowout, quite low heat buildup values and good resilience, as compared with those same carbon blacks placed in other rubber compositions.

EXAMPLE III

In this example, carbon black #3 having a highly negative tint residual value and a control industry reference carbon black designated as IRB #4 were individually placed into duplicate samples comprising medium vinyl polybutadiene, or natural rubber, or various blends of that same medium vinyl polybutadiene and natural rubber. Specimens were prepared and tested according to various ASTM tests. The dynamic wire cord adhesion values of the prepared samples were of particular interest.

The properties of carbon black IRB #4 and carbon black #3 are given in Table III-A. It is seen that these two carbon blacks are quite similar except for their tint and tint residual values.

TABLE III-A

| Physical Property | IRB #4 (Control) | Carbon Black #3 |
|---|---|---|
| $N_2SA$, $m^2/g$ | 82 | 90 |
| CTAB, $m^2/g$ | 83 | 83 |
| 24M4 DBP, cc/100g | 86 | 87 |
| Tint | 107 | 88 |
| Tint Residual | +4 | −13 |

Each of these two carbon blacks was used in preparing various compositions, the recipes of which are shown in Table III-B.

Each rubber composition of which the recipe was given in Table III-B was mixed in accordance with the following procedure, the procedure being such that the dispersion of the ingredients was substantially complete after the mixing procedure was carried out. For each run, the ingredients in the appropriate amount given in Table III-B were mixed in a laboratory size (Midget or BR) Banbury mixer generally for about 2-6 minutes, more usually for about 2-3 minutes with a cooling water jacket and generally with a dump temperature of about 150°-170° C. This was followed by a 1½ minute remix in the Banbury mixer at 80 rpm, with cooling water in the jacket. Following this mixing was a 4 minute remill on a roll mill at a roll temperature of 70° C.

The period for curing of each of the samples in Example III was 30 minutes, and the cure temperature for each sample was 150° C. This selection of time and temperature was thought to provide an optimum cure.

Specimens were prepared with a single embedded metal cord and were subjected to dynamic wire cord adhesion tests (defined below in Table III-C), in duplicate. All specimens were prepared with brass-plated steel wire made for passenger tires. The type and size of wire used was the same in all specimens, as was the number of wires and the method of winding of the wires, for all specimens these variables being specified by the designation 1×3+5×7+1×0.15, which quan-

TABLE III-B

| | Parts by Weight of Ingredients | | | | | | | | | |
|---|---|---|---|---|---|---|---|---|---|---|
| | Run No. | | | | | | | | | |
| Ingredient | 13 | 14 | 15 | 16. | 17 | 18 | 19 | 20 | 21 | 22 |
| Natural Rubber[a] | 100 | 100 | 100 | 70 | 50 | 70 | 50 | 100 | — | — |
| Medium Vinyl Polybutadiene[b] | — | — | — | 30 | 50 | 30 | 50 | — | 100 | 100 |
| IRB #4 Carbon Black | 55 | — | 55 | 55 | 55 | — | — | 55 | 55 | — |
| Carbon Black #3 | — | 55 | — | — | — | 55 | 55 | — | — | 55 |
| Zinc Oxide | 8 | 8 | 8 | 8 | 8 | 8 | 8 | 8 | 8 | 8 |
| Stearic Acid | 1 | 1 | 1 | 1 | 1 | 1 | 1 | 1 | 1 | 1 |
| Flexamine G[c] | 1 | 1 | 1 | 1 | 1 | 1 | 1 | 1 | 1 | 1 |
| Insoluble Sulfur[d] | 4.5 | 4.5 | 4.5 | 4.5 | 4.5 | 4.5 | 4.5 | 4.5 | 4.5 | 4.5 |
| Vulkacit ® DZ[e] (accelerator) | 0.8 | 0.8 | 0.8 | 0.8 | 0.8 | 0.8 | 0.8 | 0.8 | 0.8 | 0.8 |
| Cobalt Naphthenate[f] (adhesive promoter) | 3 | 3 | 3 | 3 | 3 | 3 | 3 | 3 | 3 | 3 |

[a]SMR-5L, previously defined in Table I-B.
[b]This medium vinyl polybutadiene rubber polymer had a vinyl content of 43.6% vinyl, a trans content of 30.8%, and therefore a cis content of 25.6%; and it had a Mooney value of 41 ML-4 at 100° C.
[c]previously defined in Table I-B.
[d]Amorphous form which also is polymeric in form and which is insoluble in most solvents (including carbon disulfide) and insoluble in the rubber compositions of which the recipes were recited in Tables III-B and IV-B.
[e]N,N-dicyclohexyl-2-benzothiazyl sulfenamide, manufactured by Mobay Chemical Co., Div. of Baychem Corp.
[f]Manufactured by Ferro Chemical Co., containing 6 weight percent cobalt.

Using the recipes given in Table III-B, samples were prepared and were subjected to various tests. The definitions of and results of those tests are shown in Table III-C.

The procedure of mixing which was used in forming the various compositions in Example 3 was the following.

tity and steel cord construction are defined in ASTM D 2969. Therefore, the only variable which was thought to influence the variation in the dynamic wire cord adhesion data was the proportion of natural rubber to medium vinyl polybutadiene in the rubber blend and the type of carbon black used.

TABLE III-C

| | Run No. | | | | | | | | | |
|---|---|---|---|---|---|---|---|---|---|---|
| Property | 13 | 14 | 15 | 16 | 17 | 18 | 19 | 20 | 21 | 22 |
| Shore A Hardness[a] | 78 | 71.5 | 75 | 77 | 77 | 71 | 73 | 78 | 78 | 74 |
| 200% Modulus[b], MPa | 11.1 | 10.4 | 11.4 | 13.0 | 13.4 | 12.0 | 11.6 | 12.7 | 10.3 | 9.6 |
| Tensile Strength[c], MPa | 25.9 | 24.9 | 25.3 | 20.5 | 17.0 | 18.3 | 16.6 | 24.6 | 18.9 | 19.1 |
| Elongation[d], Percent | 400 | 380 | 400 | 290 | 240 | 270 | 250 | 370 | 330 | 320 |
| Firestone Heat Buildup, ΔT, °C.[e] | 77.8 | 65.6 | 75.0 | 71.1 | 74.4 | 66.1 | 68.9 | 76 | 102 | 90 |
| Goodrich Heat Buildup, ΔT, °C.[f] | 30.0 | 22.5 | 30.0 | 30.8 | 32.5 | 23.9 | 25.1 | 30.9 | 45.6 | 39.3 |
| Permanent Set, %[g] | 1.7 | 1.2 | 1.8 | 1.1 | 0.9 | 0.9 | 0.8 | 2.0 | 3.7 | 2.6 |
| Yerzley Resilience, %[h] | 65.5 | 73.6 | 64.9 | 65.8 | 66.4 | 74.4 | 73.1 | 64.4 | 62.6 | 68.6 |
| Goodrich Blowout, Time to Blowout, Minutes (100° C. oven, 5.72 mm stroke, 1378 kPa load) | 14.3 | 21.7 | 12.9 | >30 | >30 | >30 | >30 | 11.3 | * | * |

TABLE III-C-continued

| Property | Run No. | | | | | | | | | |
|---|---|---|---|---|---|---|---|---|---|---|
| | 13 | 14 | 15 | 16 | 17 | 18 | 19 | 20 | 21 | 22 |
| Dynamic Wire Cord Adhesion (300 lb. load, 0.20 inch throw)[i] | | | | | | | | | | |
| Time to Fail, Minutes[j] | 42.4 | 88.9 | 43.8 | 89.8 | 64.9 | 149.6 | 164.8 | 29.1 | 17.5 | 25.4 |
| Probe Temperature, °C.[k] | 138 | 140 | 142 | 134 | 137 | 116 | 126 | 156 | 147 | 140 |
| Dynamic Wire Cord Adhesion (150 lb. load, 0.275 inch throw) | | | | | | | | | | |
| Time to Fail, Minutes | 29.8 | 74.6 | 32.2 | 62.5 | 56.5 | 134.5 | 156.3 | 26.1 | 20.6 | 28.4 |
| Probe Temperature, °C. | 151 | 141 | 152 | 152 | 150 | 131 | 131 | 147 | 155 | 137 |

*Sample slipped out of test machine before a value could be determined.
[a] Determined in accordance with ASTM D 2240-75.
[b]-[h] Previously defined in Table I-C.
[i]-[k] Determined in accordance with a procedure which is described in Stewart, E. J. Rubber Age, Vol. 105, May, 1973, p. 61, with loads and throws described above.

Figure 1A:
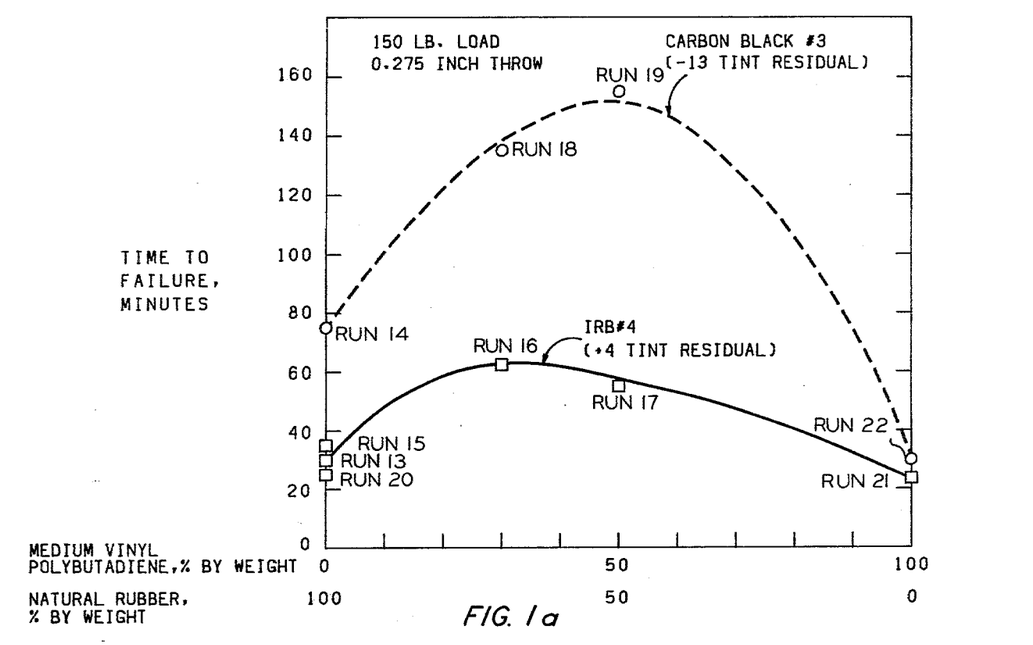
Figure 1B:
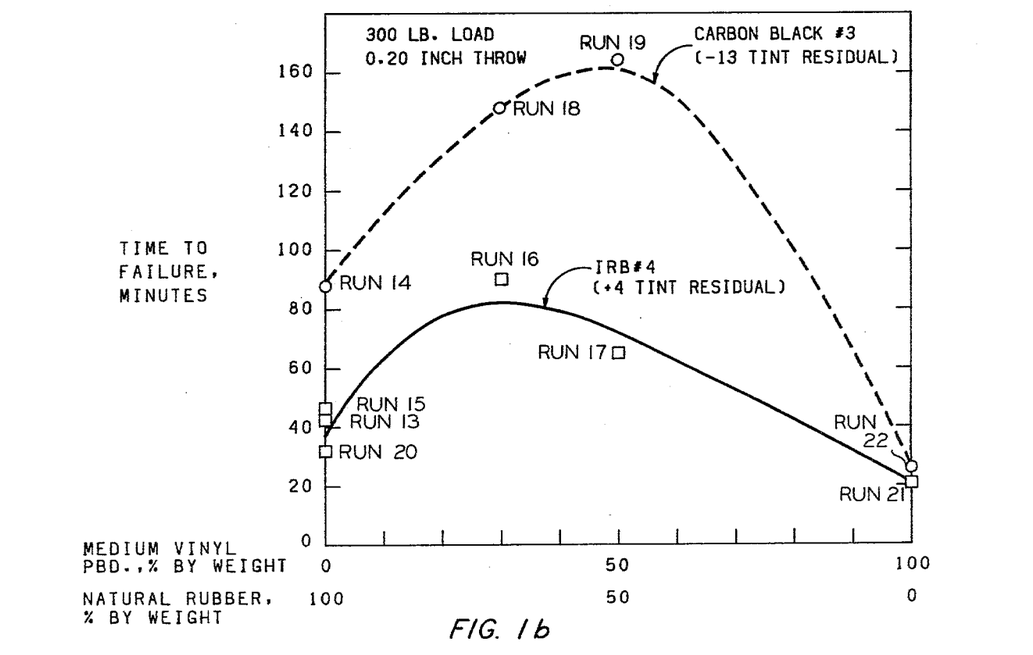

The dynamic wire cord adhesion data for the vulcanized invention compositions using a carbon black having a tint residual value of −13 and for the vulcanized control compositions using a carbon black having a tint residual value of +4 in various rubbery composition including medium vinyl polybutadiene, natural rubber, and blends of medium vinyl polybutadiene and natural rubber for a 150 pound load and a 0.275 inch throw are shown in FIG. 1a. In FIG. 1b, the analogous data using a 300 pound load and a 0.20 inch throw are shown for these same two carbon blacks in the analogous vulcanized rubber compositions.

In FIG. 1a and FIG. 1b, one can further observe the remarkably good dynamic wire cord adhesion values of vulcanized samples prepared with carbon blacks having highly negative tint residual values in blends of medium vinyl polybutadiene and of natural rubber, particularly in the range from about 30:70 to about 60:40 parts by weight of medium vinyl polybutadiene:parts by weight of natural rubber. Each of the two graphs shows a peak value located within the range recited above. One can readily see that the wire cord adhesion values for vulcanized blends of medium vinyl polybutadiene and of natural rubber are much greater than the corresponding values for vulcanized medium vinyl polybutadiene or for vulcanized natural rubber, regardless of the carbon black. However, when one compares the time to failure of two blended compositions having the same respective weight ratios of medium vinyl polybutadiene:natural rubber but containing different carbon blacks, the composition which contains the carbon black having the more negative tint residual has a much longer time to failure than the corresponding composition which contains the carbon black having the more positive tint residual value.

EXAMPLE IV

In this example, carbon black #4 having a highly negative tint residual value and a control carbon black having a positive tint residual value and designated Philblack N347 #1 (available from Phillips Petroleum Company) were placed into various rubbery compositions, including medium vinyl polybutadiene, natural rubber, and blends of medium vinyl polybutadiene and natural rubber. The properties of these two carbon blacks are shown in Table IV-A. Again, the dynamic wire cord adhesion values of the prepared samples were of particular interest.

TABLE IV-A

| Physical Property | Philblack N347 #1 (control) | Carbon Black #4 |
|---|---|---|
| $N_2SA$, $m^2/g$ | 93 | 93 |
| CTAB, $m^2/g$ | 91 | 88 |
| 24M4 DBP, cc/100g | 100 | 100 |
| Tint | 105 | 91 |
| Tint Residual | +2 | −10 |

Each of these two carbon blacks was used in preparing various compositions, the recipes of which are shown in Table IV-B.

TABLE IV-B
(Parts by Weight)

| Ingredient | Run No. | | | | | | | |
|---|---|---|---|---|---|---|---|---|
| | 23 | 24 | 25 | 26 | 27 | 28 | 29 | 30 |
| Natural Rubber[a] | 100 | 150 | 50 | 50 | 30 | 30 | — | — |
| Medium Vinyl Polybutadiene[b] | — | — | 50 | 50 | 70 | 70 | 100 | 100 |
| Carbon Black #4 | 55 | — | 55 | — | 55 | — | 55 | — |
| Philblack N347 #1 | — | 55 | — | 55 | — | 55 | — | 55 |
| Zinc Oxide | 8 | 8 | 8 | 8 | 8 | 8 | 8 | 8 |
| Stearic Acid | 1 | 1 | 1 | 1 | 1 | 1 | 1 | 1 |
| Flexamine G | 1 | 1 | 1 | 1 | 1 | 1 | 1 | 1 |
| Insoluble Sulfur[c] | 4.5 | 4.5 | 4.5 | 4.5 | 4.5 | 4.5 | 4.5 | 4.5 |
| Vulkacit DZ[d] | 0.8 | 0.8 | 0.8 | 0.8 | 0.8 | 0.8 | 0.8 | 0.8 |
| Cobalt Naphthenate[e] | 3 | 3 | 3 | 3 | 3 | 3 | 3 | 3 |

[a] Same as [a] in Table III-B
[b] Same as [b] in Table III-B
[c], [d] and [e] Previously defined in Table III-B.

The curing time for all of the specimens in Example IV was 30 minutes and the curing temperature was 150° C. These conditions were thought to provide an optimum cure.

The metal tire cord embedded specimens were prepared and tested as described in Example III, except that the recipes in Table IV-B were here followed.

The recipes shown in Table IV-B were used to prepare specimens, which were then subjected to various tests. The results of and definitions of those tests are shown in Table IV-C.

TABLE IV-C

| Property | Parts by Weight* Run No. | | | | | | | |
|---|---|---|---|---|---|---|---|---|
| | 23 | 24 | 25 | 26 | 27 | 28 | 29 | 30 |
| Natural Rubber (SMR-5L) | 100 | 100 | 50 | 50 | 30 | 30 | — | — |
| Medium Vinyl Polybutadiene$^{(a)}$ | — | — | 50 | 50 | 70 | 70 | 100 | 100 |
| Carbon Black #4 | 55 | — | 55 | — | 55 | — | 55 | — |
| Philblack N347 #1 | — | 55 | — | 55 | — | 55 | — | 55 |
| Shore A Hardness | 74 | 75 | 78 | 78 | 76 | 79 | 76 | 78 |
| 200% Modulus, MPa | 13.3 | 13.5 | 15.3 | 15.8 | 14.9 | 14.4 | 12.0 | 11.5 |
| Tensile Strength, MPa | 20.7 | 23.4 | 19.9 | 18.5 | 17.9 | 17.7 | 20.9 | 20.3 |
| Elongation, % | 280 | 330 | 240 | 230 | 230 | 240 | 310 | 310 |
| Firestone Heat Build-up, °C. | | | | | | | | |
| (Surface temperature at 60 minutes) | 72 | 79 | 73 | 83 | 80 | 91 | 91 | 138 |
| Goodrich ΔT, °C. | 26 | 32 | 30 | 33 | 35 | 36 | 40 | 41 |
| Permanent Set, % | 1.5 | 2.0 | 0.9 | 1.1 | 1.1 | 1.3 | 1.7 | 2.7 |
| Yerzley Resilience, % | 70 | 63 | 69 | 65 | 69 | 65 | 67 | 64 |
| Goodrich Blow-out (100° C. oven, 5.72 mm stroke, 1378 kPa load) | | | | | | | | |
| Time to Blowout, minutes | 13.9 | 9.6 | 42.5 | >60 | >60 | >60 | >60 | >60 |
| Dynamic Wire Cord Adhesion (300 lb load, 0.20 inch throw) | | | | | | | | |
| Time to Fail, minutes | 28.9 | 19.4 | 44.9 | 32.2 | 47.5 | 32.7 | 25.1 | 15.7 |
| Probe Temp., °C. | 142 | 146 | 142 | 150 | 147 | 155 | 155 | 162 |
| Dynamic Wire Cord Adhesion (150 lb load, 0.275 inch throw) | | | | | | | | |
| Time to Fail, minutes | 32.7 | 19.1 | 57.9 | 34.2 | 67.7 | 30.0 | 26.5 | 14.2 |
| Probe Temp., °C. | 142 | 147 | 148 | 158 | 153 | 158 | 164 | 166 |

*The test procedures used to determine the properties listed in this table were the same as previously described in Table III-C, with the exception of the Goodrich blowout test, which was previously described in footnote $^{(c)}$ in Table I-C.

Figure 2A:
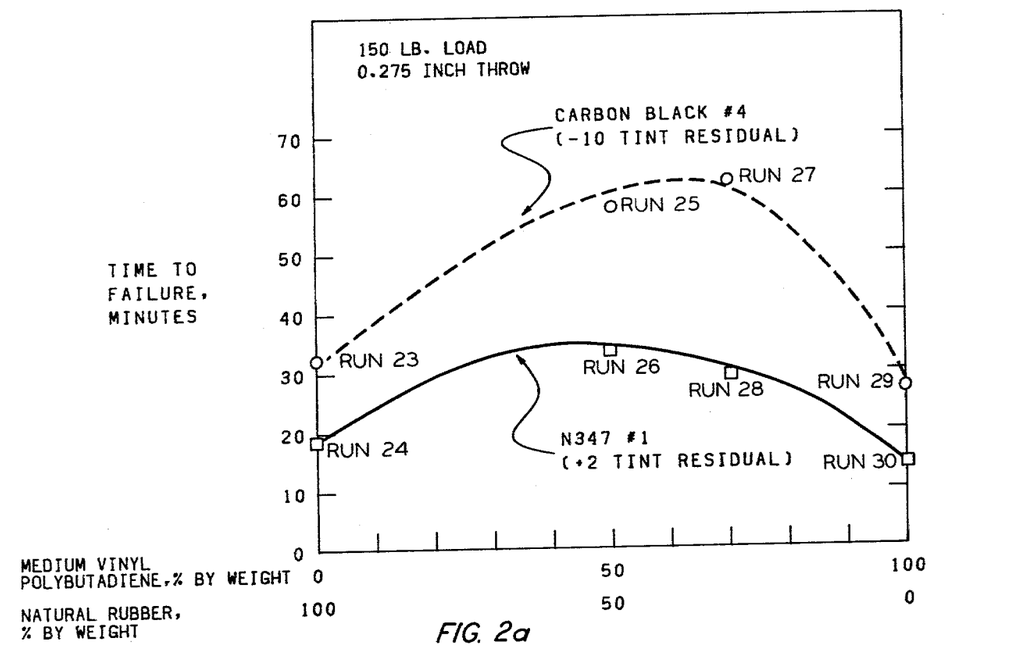
Figure 2B:
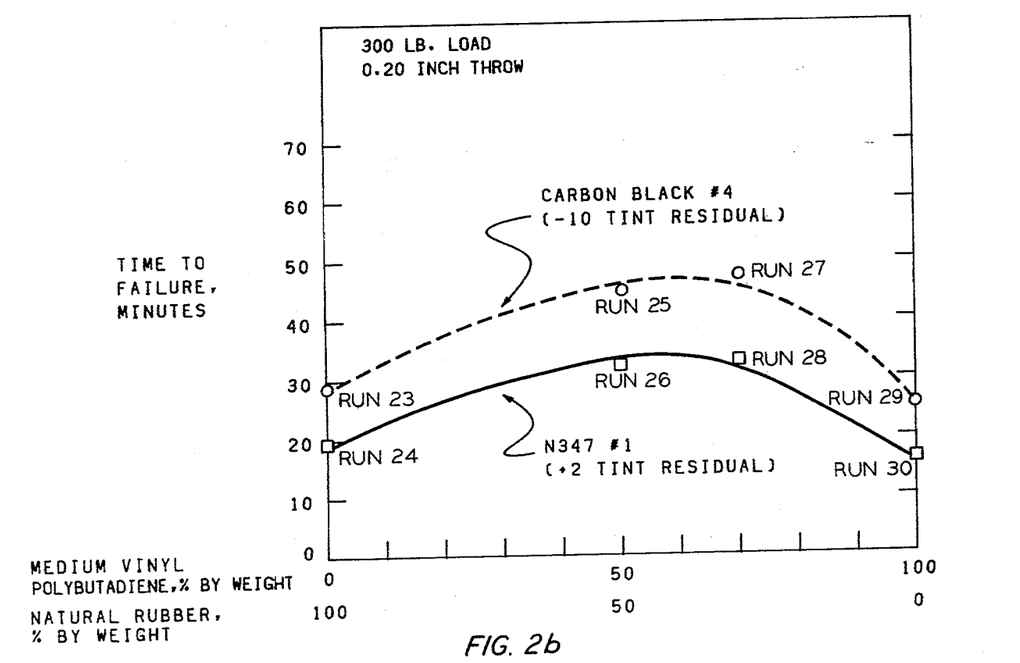

The dynamic wire cord adhesion data found in Table IV-C are plotted in FIGS. 2a and 2b, the graph in FIG. 2a showing the data for the test using a 150 lb. load with a 0.275 inch throw and the graph in FIG. 2b showing the dynamic wire cord adhesion data obtained with a 300 lb. load and a 0.20 inch throw. From these two graphs, it can be observed that when a carbon black having a highly negative tint residual value is placed into various blends of natural rubber with medium vinyl polybutadiene, the resulting compositions after vulcanization have outstandingly high dynamic cord adhesion values, especially in the range from about 50:50 to about 75:25 parts by weight of medium vinyl polybutadiene:-parts by weight of natural rubber. These values are higher than the values for that same carbon black placed into medium vinyl polybutadiene or into natural rubber and are also higher than the dynamic wire cord adhesion values of samples prepared from a carbon black having a more positive tint residual value which is placed into either natural rubber or into medium vinyl polybutadiene or into any blend thereof.

It is intended that the claims which follow should be interpreted to cover modifications and equivalents of the above description which would be apparent to one with ordinary skill in the art.

I claim:

1. A vulcanizable rubber composition comprising a rubber and a carbon black,
   wherein the rubber is selected from the group consisting of polybutadiene having a vinyl content within the range from about 30 to about 80 mole percent and a blend of natural rubber and polybutadiene having a vinyl content within the range from about 30 to about 80 mole percent, and
   wherein the carbon black has a tint residual less than about −6,
   wherein tint residual (TR) of a carbon black is defined by the formula:

$TR = T - [56.0 + 1.057(CTAB) - 0.002745(CTAB)^2 - 0.2596(DBP) - 0.201(N_2SA - CTAB)]$, wherein CTAB is the surface area in square meters per gram of the carbon black measured as described by J. Janzen and G. Kraus in Rubber Chemistry and Technology, 44, 1287(1971),
   wherein $N_2SA$ is the surface area in square meters per gram of the carbon black measured using nitrogen in accordance with ASTM method D 3037-71T,
   wherein DBP is the structure of the carbon black in cubic centimeters per 100 grams and is measured in accordance with U.S. Pat. No. 3,548,454, and, after crushing, by method B in accordance with ASTM D 2414-70, and wherein DBP is also referred to as 24 M4 DBP, and
   wherein T is the tint or tinting strength of the carbon black and is measured in accordance with ASTM 3265-75.

2. A rubber composition according to claim 1 wherein said carbon black has a tint residual value within the range from about −6 to about −20.

3. A rubber composition according to claim 2 wherein said carbon black has a tint value within the range from about 70 to about 100.

4. A rubber composition according to claim 3 wherein said carbon black has a CTAB surface area within the range of about 70 to about 140 m$^2$/g, a 24 M4 DBP structure within the range of about 65 to about 115 cc/100 g, and a porosity ($N_2SA - CTAB$) of about 25 m$^2$/g or less.

5. A rubber composition according to claim 1 or 4 wherein said polybutadiene has a cis content within the range from about 70 to about 10 mole percent and a trans content within the range from about 10 to about 70 mole percent.

6. A rubber composition according to claim 5 wherein said vinyl content of said polybutadiene lies within the range from about 35 to about 70 mole percent.

7. A rubber composition according to claim 6 wherein said vinyl content of said polybutadiene lies within the range from about 40 to about 65 mole percent.

8. A rubber composition according to claim 7 wherein said carbon black has a tint value of about 100 and a tint residual of about −10 and wherein said polybutadiene has a vinyl content of about 45 mole percent.

9. A rubber composition according to claim 4 or claim 6 wherein 100 parts by weight of said rubber are mixed with about 30 to about 65 parts by weight of said carbon black.

10. A rubber composition according to claim 9 or claim 8 wherein 100 parts by weight of said rubber are mixed with about 40 to about 60 parts by weight of said carbon black.

11. A vulcanizable composition according to claim 2 or 7, wherein said rubber is a blend of natural rubber and polybutadiene, wherein the weight ratio of said polybutadiene to said natural rubber is within the range from about 15:85 to about 85:15.

12. A composition according to claim 11, wherein the weight ratio of said polybutadiene to said natural rubber is within the range from about 50:50 to about 75:25.

13. A rubber composition according to claim 8 wherein about 50 parts by weight of said carbon black are mixed with 100 parts by weight of rubber consisting essentially of said polybutadiene and including also about 1.8 parts by weight of sulfur.

14. A composition according to claim 12 comprising about 50 parts by weight of natural rubber, about 50 parts by weight of said polybutadiene, about 55 parts by weight of said carbon black, and about 5 parts by weight of insoluble sulfur, wherein said carbon black has a tint residual value of about −13 and a tint value of about 90.

15. A method of preparing a vulcanized rubber composition comprising:
  (a) mixing the ingredients comprising:
    (1) a rubber selected from the group consisting of polybutadiene having a vinyl content within the range from about 30 to about 80 mole percent and blends of natural rubber with polybutadiene having a vinyl content within the range of about 30 to about 80 mole percent and
    (2) at least one carbon black having a tint residual less than about −6 so as to form a first mixture; and
  (b) curing said first mixture for a period of time such that said first mixture is optimally vulcanized, wherein tint residual (TR) of a carbon black is defined by the formula:

$$TR = T - [56.0 + 1.057(CTAB) - 0.002745(CTAB)^2 - 0.2596(DBP) - 0.201(N_2SA - CTAB)],$$

wherein CTAB is the surface area in square meters per gram of the carbon black measured as described by J. Janzen and G. Kraus in Rubber Chemistry and Technology, 44, 1287 (1971), wherein $N_2SA$ is the surface area in square meters per gram of the carbon black measured using nitrogen in accordance with ASTM method D 3037-71T, wherein DBP is the structure of the carbon black in cubic centimeters per 100 grams and is measured in accordance with U.S. Pat. No. 3,548,454, and, after crushing, by method B in accordance with ASTM D 2414-70, and wherein DBP is also referred to as 24 M4 DBP, and wherein T is the tint or tinting strength of the carbon black and is measured in accordance with ASTM 3265-75.

16. A method according to claim 15 wherein said first mixture comprises also a curing agent and an accelerator.

17. A method according to claim 16 wherein said polybutadiene has a vinyl content within the range from about 40 to about 70 percent.

18. A method according to claim 17 wherein said carbon black has a tint residual within the range from about −6 to about −20.

19. A method according to claim 18 wherein said carbon black has a tint value within the range from about 70 to about 100.

20. A method according to claim 19 wherein said first mixture comprises about 40 to about 60 parts by weight of said carbon black and about 100 parts by weight of rubber consisting essentially of said polybutadiene.

21. A method according to claim 20 wherein said first mixture comprises about 50 parts by weight of said carbon black, 100 parts by weight of rubber consisting essentially of said polybutadiene, and about 1.8 parts by weight of sulfur.

22. A method according to claim 18 wherein said first mixture comprises about 50 to about 75 parts by weight of said polybutadiene, about 50 to about 25 parts by weight of natural rubber and about 40 to about 60 parts by weight of said carbon black.

23. An article of manufacture prepared from the rubber composition according to claim 1 or claim 13.

24. An article of manufacture prepared from the rubber composition according to claim 14.

25. An article of manufacture prepared from the rubber composition prepared according to the method of claim 15.

26. An article of manufacture prepared from the rubber composition prepared according to the method of claim 21 or claim 22 and including also the step of molding said first mixture into a desired shape prior to the step of curing.

* * * * *